United States Patent [19]
Napor et al.

[11] 3,991,927
[45] Nov. 16, 1976

[54] AUTOMATIC FRAME BRAZING MACHINE

[75] Inventors: Carl A. Napor, Glen Ridge; Anthony A. Milana, Toms River, both of N.J.

[73] Assignee: Kahle Engineering Co., Union City, N.J.

[22] Filed: Mar. 28, 1975

[21] Appl. No.: 563,082

[52] U.S. Cl. .................................. 228/41; 228/47; 228/49; 29/469; 29/33 K; 219/80
[51] Int. Cl.² .................................. B23K 37/04
[58] Field of Search .............. 269/56, 57, 296, 298, 269/104, 321 F; 228/44.1, 47, 49, 41; 29/430, 469, 33 J, 33 K, 563, 37; 219/10.69, 10.71, 79, 80

[56]  References Cited
UNITED STATES PATENTS

| | | | |
|---|---|---|---|
| 1,501,129 | 7/1924 | Meiselbach | 228/44.1 X |
| 2,443,582 | 6/1948 | Lendo et al. | 269/296 |
| 2,495,333 | 1/1950 | Kraeft et al. | 29/469 |
| 2,874,522 | 2/1959 | McCabe | 29/430 X |
| 2,961,985 | 11/1960 | O'Harah | 228/41 X |
| 3,163,146 | 12/1964 | Hagner et al. | 269/57 |
| 3,566,070 | 2/1971 | Plegat | 219/79 X |

*Primary Examiner*—Al Lawrence Smith
*Assistant Examiner*—K. J. Ramsey
*Attorney, Agent, or Firm*—Holland, Armstrong, Wilkie & Previto

[57]  ABSTRACT

An automatic machine is described for completing a metal frame such as a bicycle frame by brazing the principal portions of the frame together. The machine comprises a large rotatably mounted turret which is stepped about a vertical axis. A number of brazing fixtures are mounted on the edge of the turret so that they are carried by the turret to a number of work stations. Operators at adjacent stations load several metal frame parts onto clamps on the fixtures. Spaced work stations positioned beyond the loading stations next successively and automatically apply brazing flux to the frame portions and braze the frame parts together. The brazed frames are finally carried by the turret to a cooling station and then to a final unloading station.

21 Claims, 29 Drawing Figures

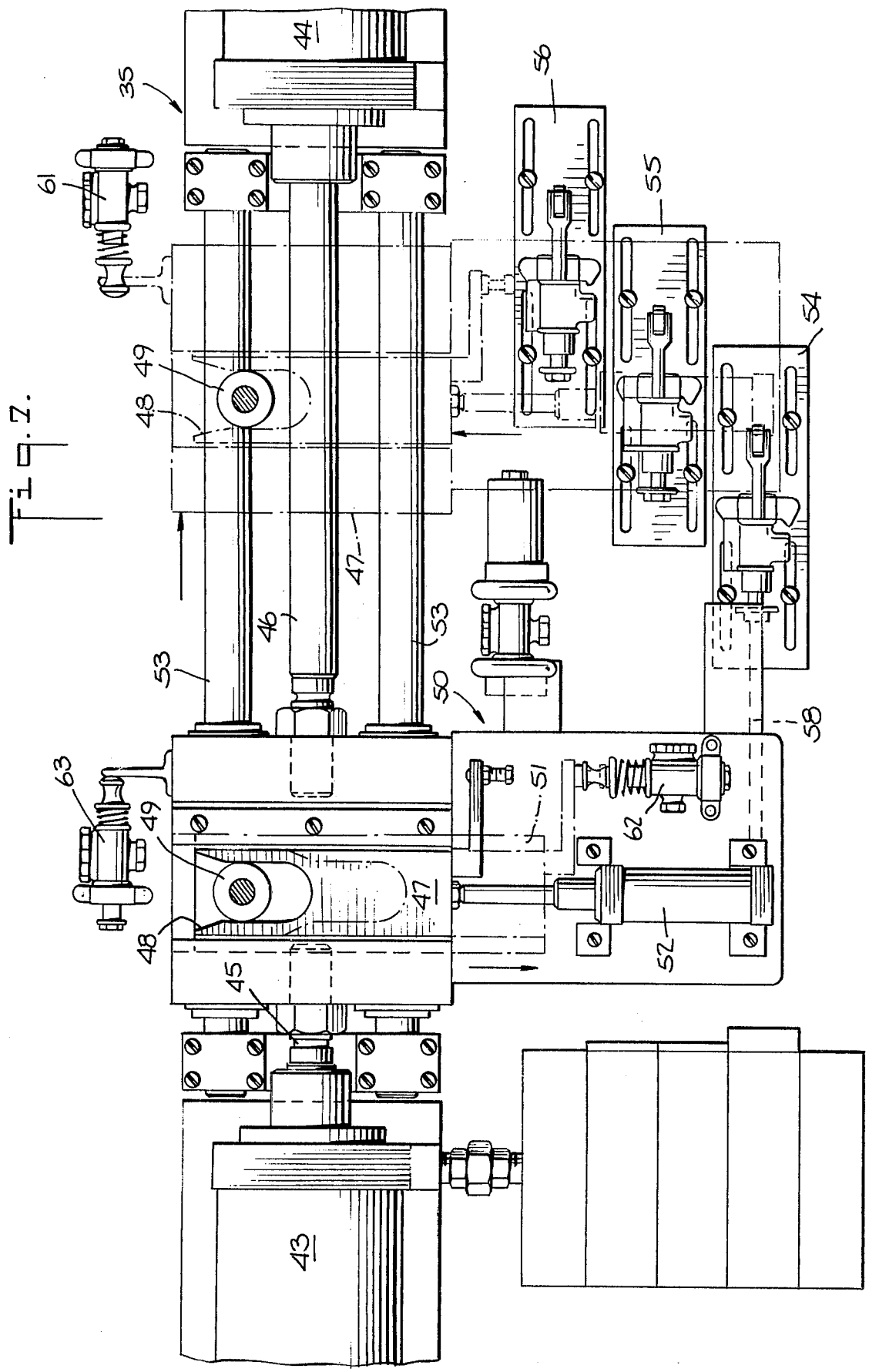

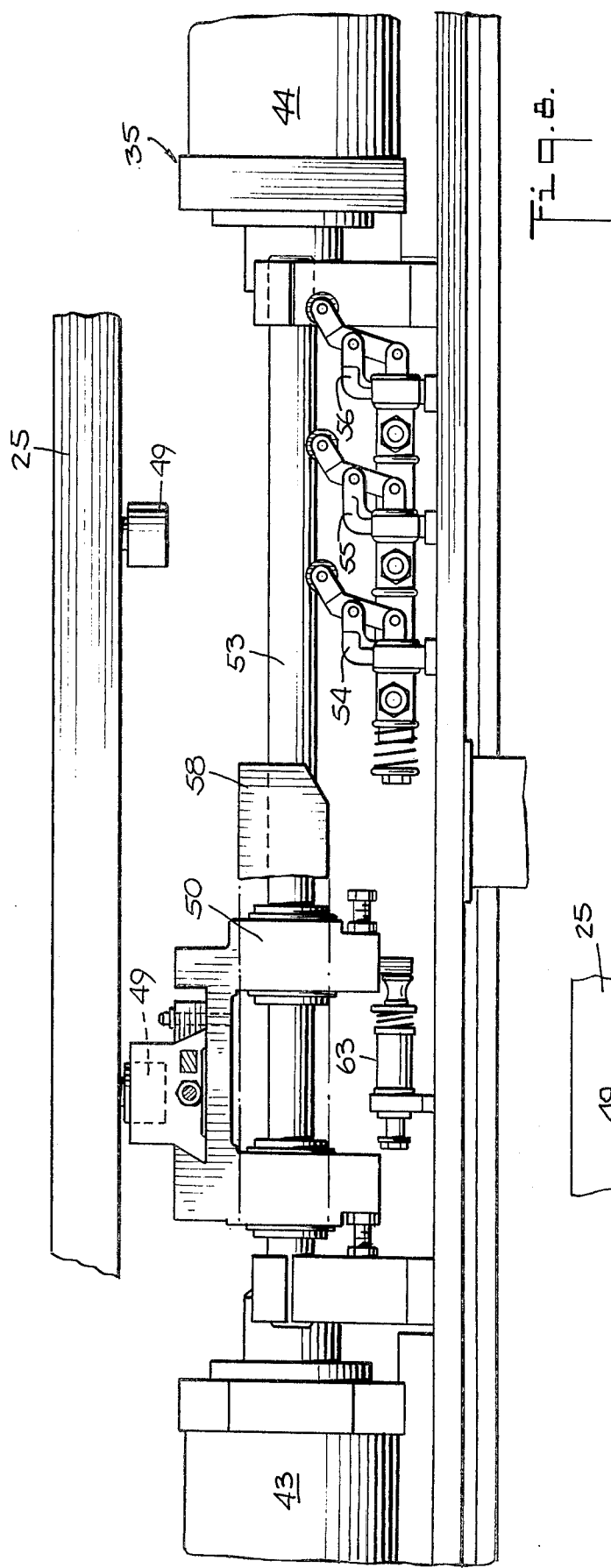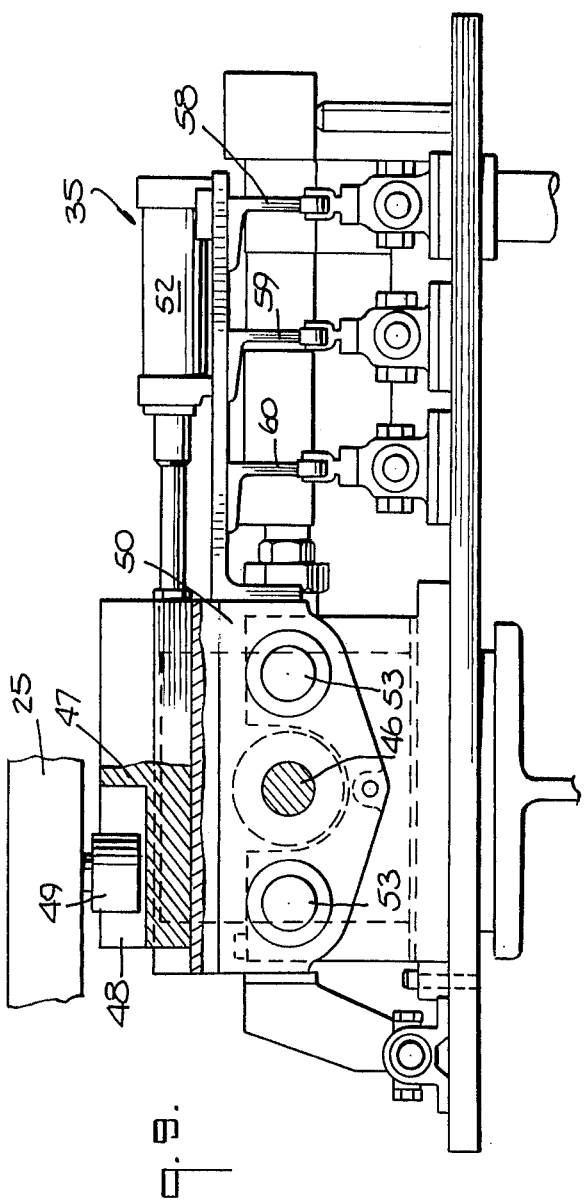

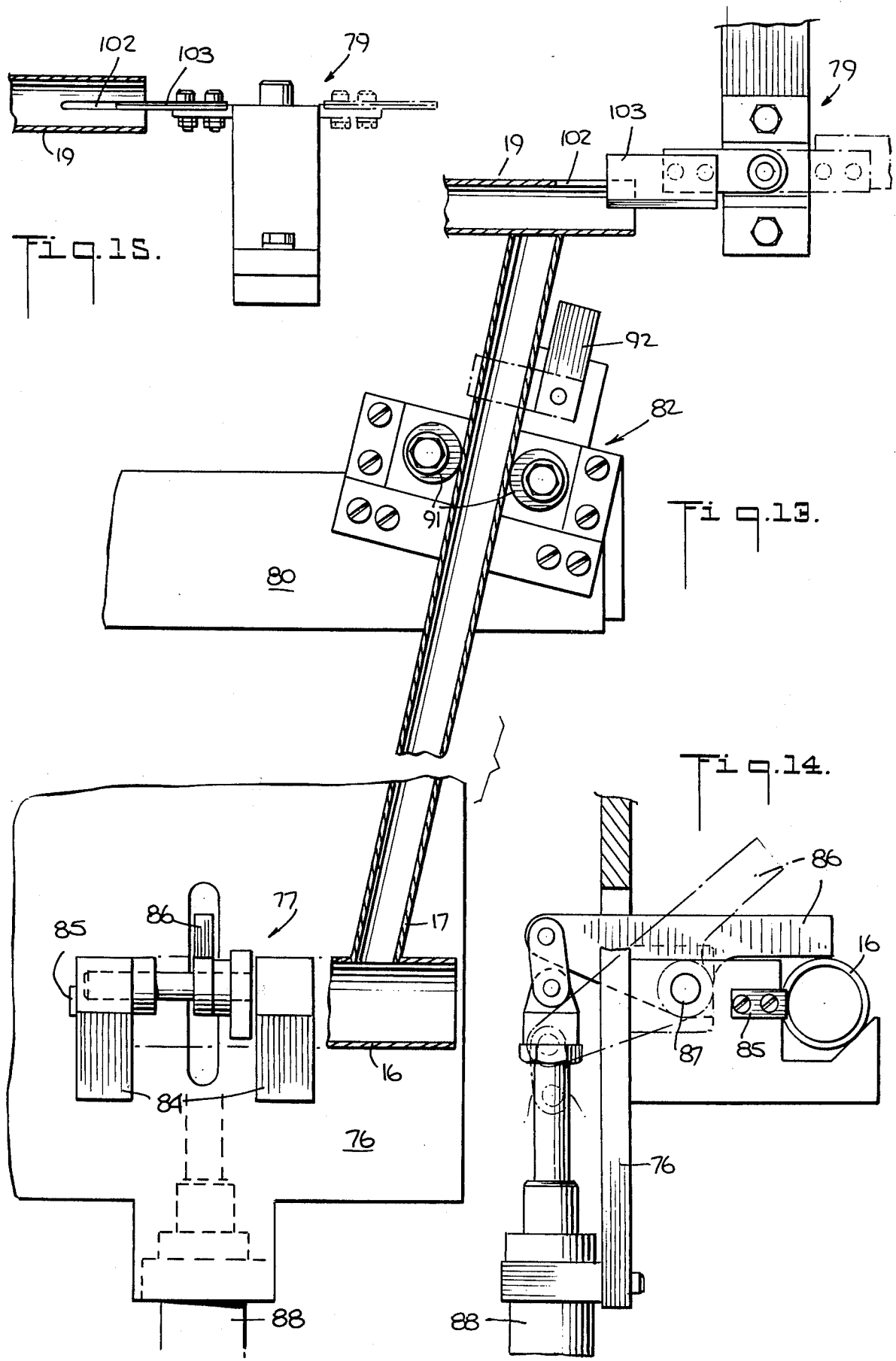

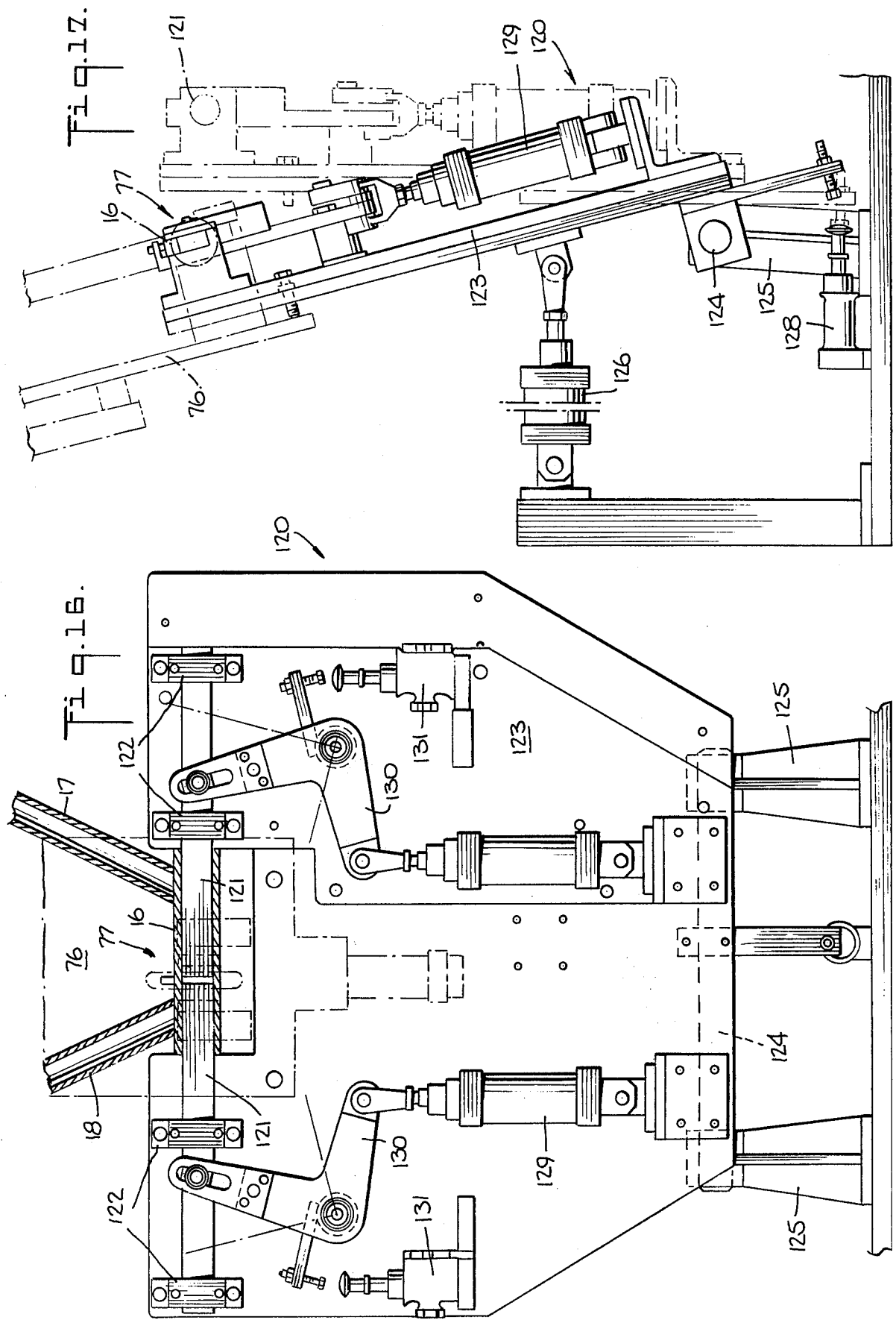

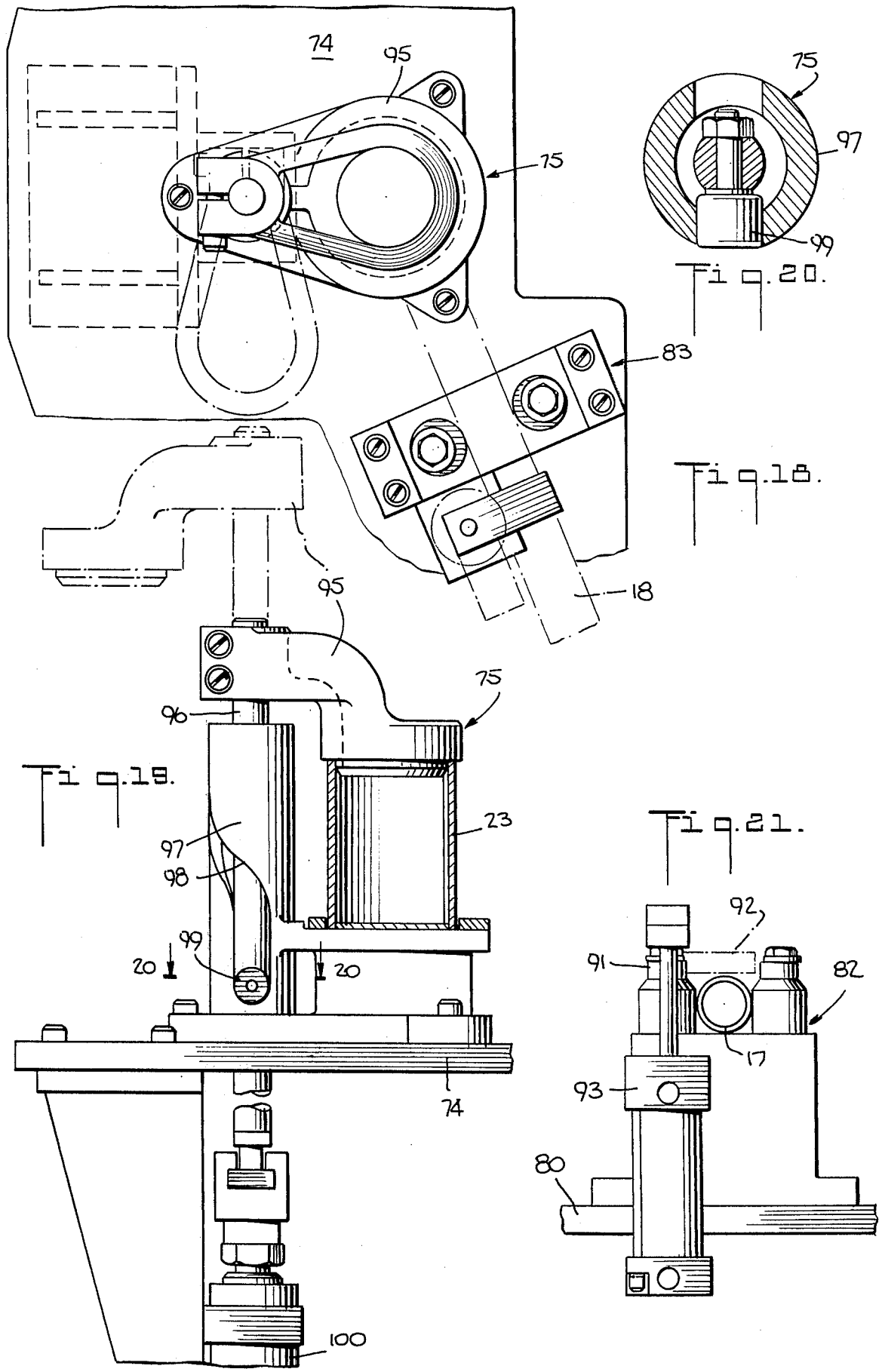

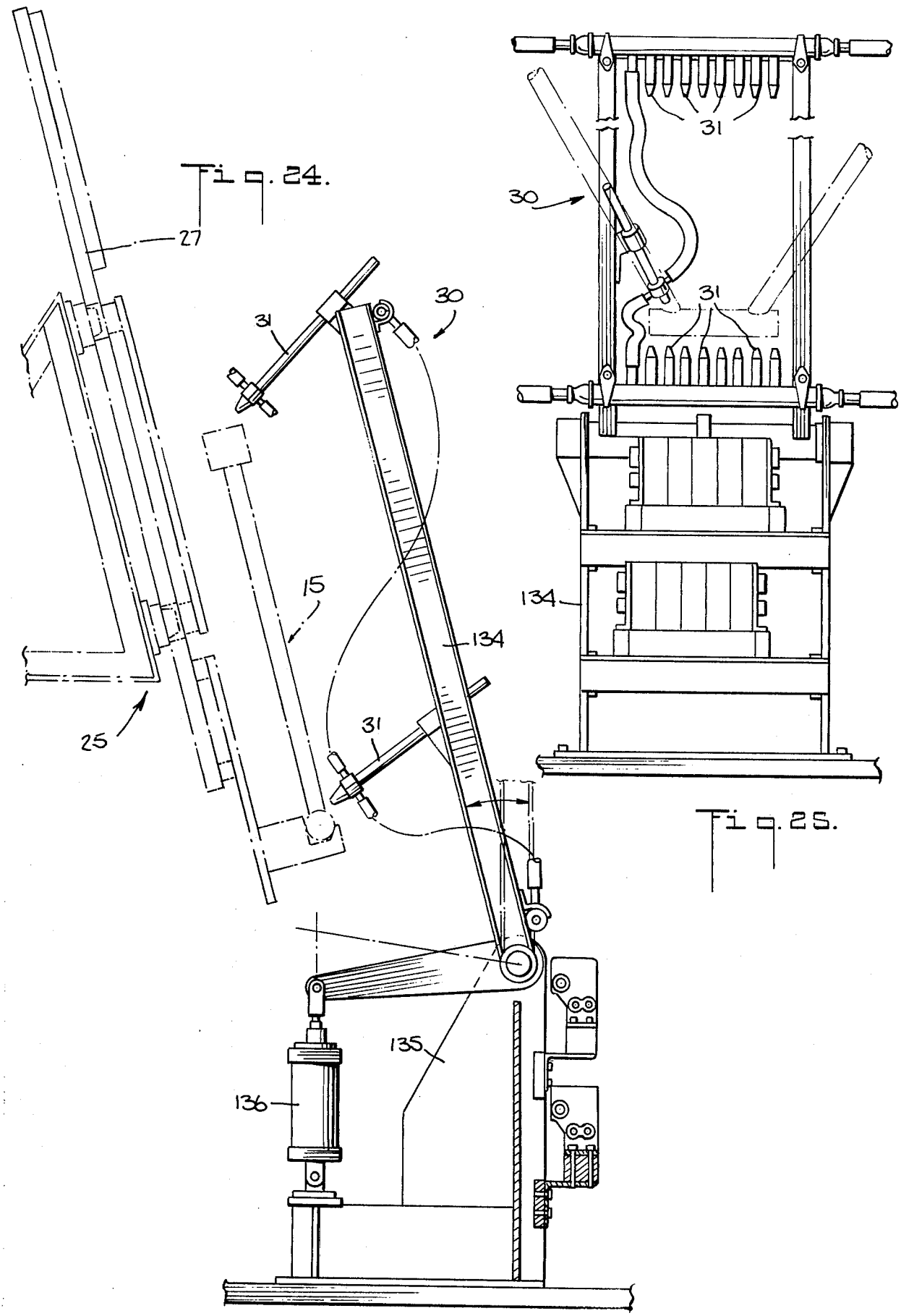

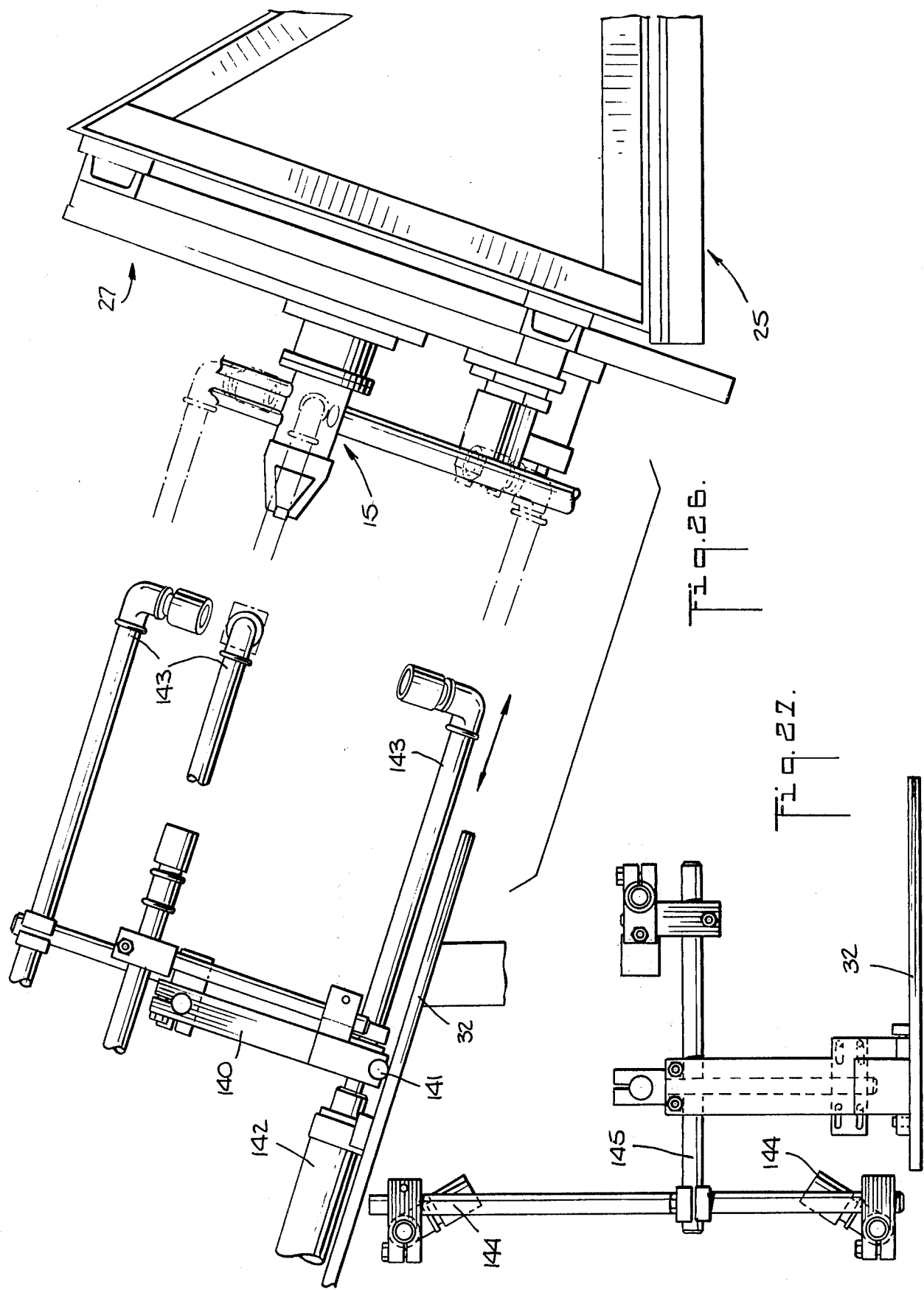

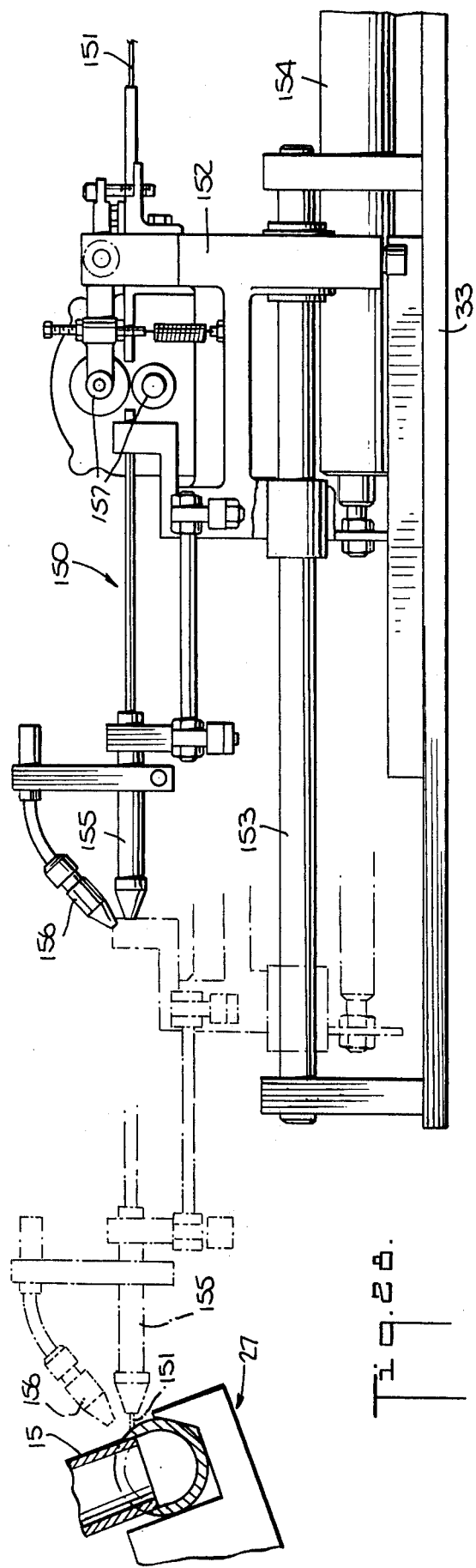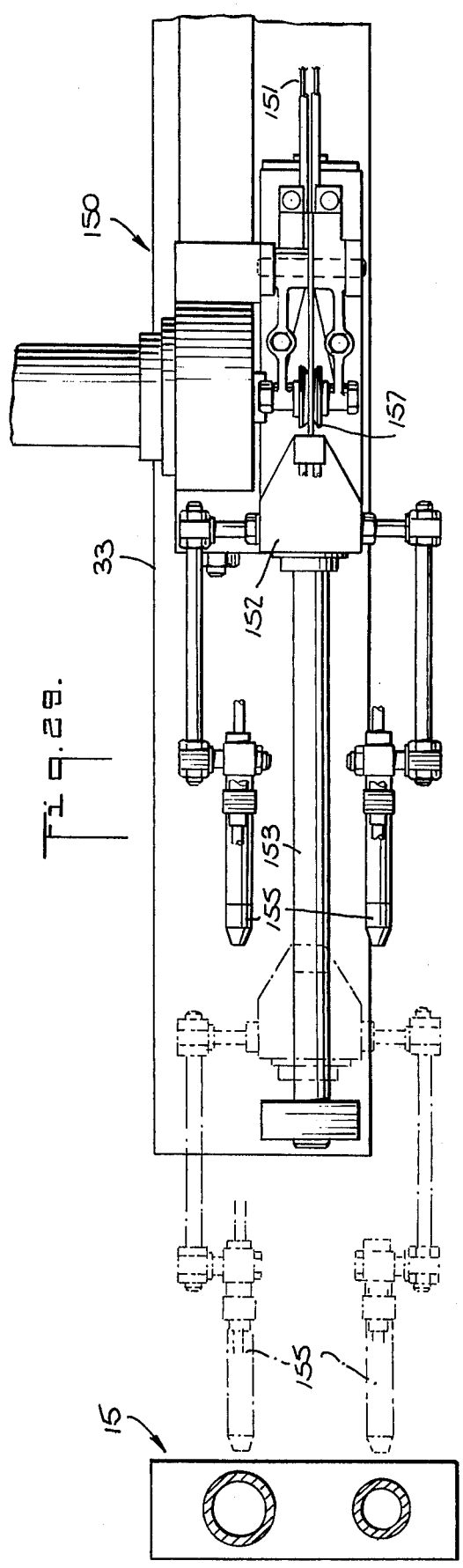

AUTOMATIC FRAME BRAZING MACHINE

BACKGROUND OF THE INVENTION

The present invention relates to an improved automatic machine for fastening portions of a metal frame together as, for example, by brazing the members of a bicycle frame together. There are a number of products which include metal frames consisting of a number of tubular or other metal members. These members are brazed or welded together to form a unitary frame. An example of such metal frames which are used in enormous and increasing numbers are bicycle frames where the frames consist of a number of steel tubular members which are brazed to one another to form the rigid central bicycle frame.

These frames are customarily assembled by having their several principal members mounted onto a stationary rack or jig by an operator who then welds or brazes the members together using appropriate fluxing, brazing, or welding tools. Such operations are relatively slow and require a large number of manual steps as the frame parts are mounted on the jig and as the several individual brazes or welds are made. Such a high labor operation necessarily results in a relatively slow frame production rate and comprises a relatively expensive manufacturing step. The continuous production of acceptable frames also requires a high degree of aptitude and skill on the part of the operator.

The machine of the present invention provides an automatic machine having a number of spaced automatic fluxing and brazing stations. With this machine it is only necessary to load the frame parts onto a jig or fixture at one or more loading stations and then the machine automatically performs the fluxing and brazing steps. The machine uses a multi-station turret arrangement to provide a high output as a large number of frames, such as a dozen or more, are simultaneously being operated on at a corresponding number of work stations. This automatic arrangement increases the output rate and also provides an adjustable and uniformly controlled welding or brazing arrangement for insuring high quality fastening operations. This produces uniformly high quality frames at the increased speeds without requiring highly skilled operators.

Accordingly, an object of the present invention is an improved automatic frame fastening machine.

Another object of the invention is to provide an improved automatic machine for brazing metal frames.

Another object of the invention is to provide an automatic machine for fastening relatively large metal members together to form a unitary frame.

Another object of the invention is to provide an improved automatic bicycle frame brazing machine.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 7 is a detailed top plan view of the pneumatic indexer.

FIG. 8 is a side elevational view of the pneumatic indexer of FIG. 7.

FIG. 9 is an end elevational view partially in section of the pneumatic indexer of FIG. 8.

FIG. 13 is an enlarged detailed view illustrating frame tubes held in the head tube clamp, the upright tube slot gauge, and the upper tube clamp on a brazing fixture.

FIG. 14 is an enlarged detailed end view of the head tube clamp assembly.

FIG. 15 is an enlarged top plan view of the upright tube slot gauge assembly.

FIG. 16 is a front elevational view of the head tube gauge assembly.

FIG. 17 is a side elevational view of the head tube gauge assembly of FIG. 16.

FIG. 18 is an enlarged front elevational view of the hanger tube clamp assembly.

FIG. 19 is a detailed top plan view of the hanger clamp assembly of FIG. 18.

FIG. 20 is a sectional view of the hanger tube clamp assembly taken along line 20—20 on FIG. 19.

FIG. 21 is a top plan view of the upper or lower tube clamp assemblies.

FIG. 24 is a side elevational view of the flux dispenser assembly at Station 4.

FIG. 25 is a front elevational view of the flux dispenser of FIG. 24.

FIG. 26 is a side elevational view of a nozzle assembly for the hanger tube heating FIG. 27 is a side elevational view of a nozzle frame mounting for a heating or brazing station.

FIG. 28 is a side elevational view of a brazing wire feeder for the head tube braze.

FIG. 29 is a top plan view of the brazing wire feeder of FIG. 28.

DESCRIPTION OF THE PREFERRED EMBODIMENT

The automatic machine of this invention has a number of fixtures for supporting metal frame members in a precise arrangement and for fastening these members together into a unitary frame by a brazing or similar operation. A preferred embodiment of the machine will be described for brazing a number of steel tubular members together to form a bicycle frame.

Figure 2:
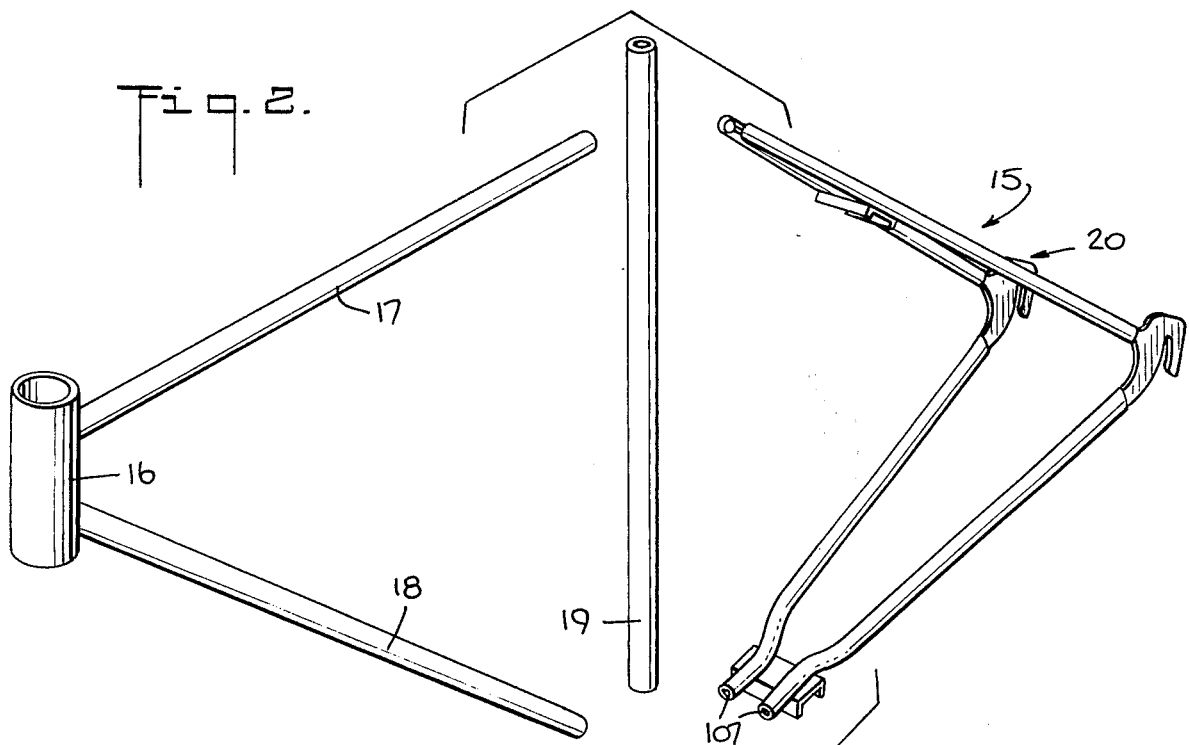
FIG. 2 is a perspective view illustrating the principal metal members of a bicycle frame prior to being fastened.
Figure 4:
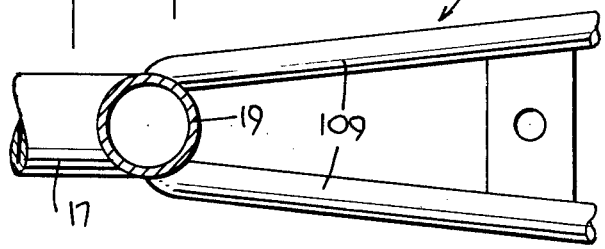
FIG. 4 is an enlarged detailed view illustrating the junction of the rear frame with the vertical and upper front tube members.
Figure 5:
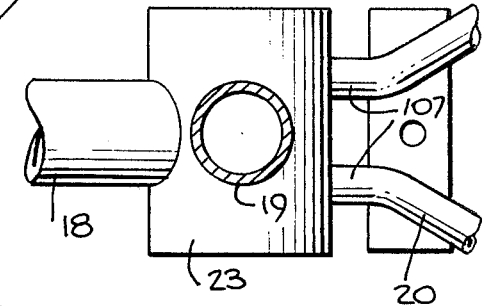
FIG. 5 is an enlarged detailed view illustrating the fastening of the hanger tube to the rear frame and to the lower front tube.
Figure 3:
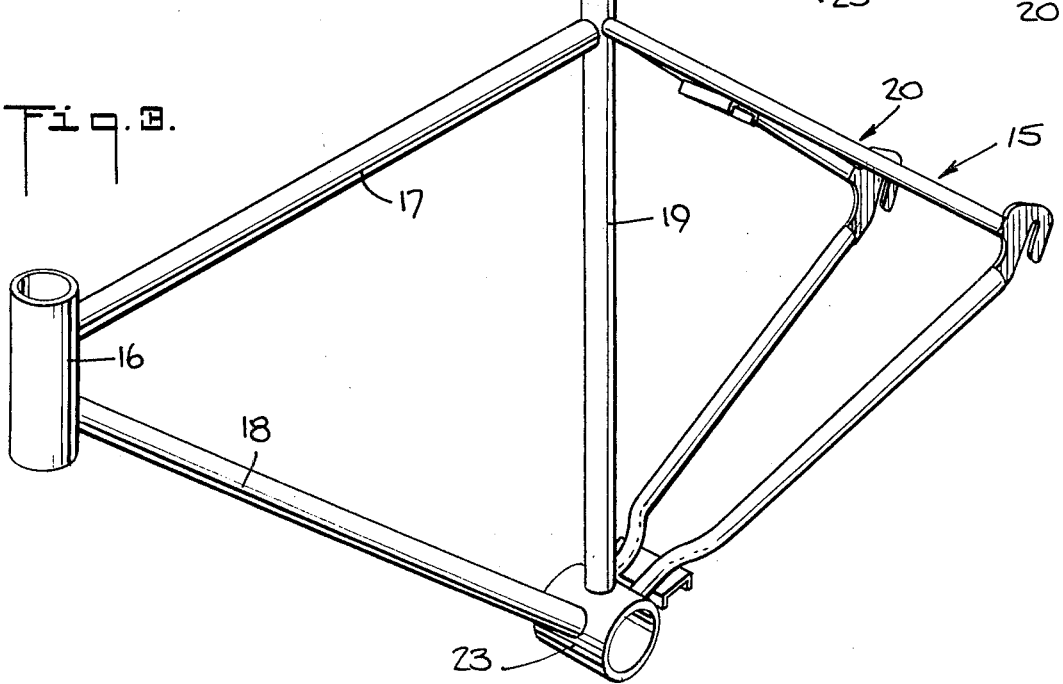
FIG. 3 is a perspective view of a completed or fastened bicycle frame.

FIGS. 2 through 5 illustrate a typical metal bicycle frame 15 of the type which is assembled on the machine of the invention. FIG. 2 illustrates four principal portions of a bicycle frame prior to their being fastened together. These include a first preliminary assembly including a metal head tube 16 having two holes drilled in it for loosely receiving the ends of upper and lower metal front tubes 17 and 18. A second important frame member comprises the hollow steel upright tube 19 shown at the center of FIG. 2. A third member of the frame assembly comprises a pre-assembled rear frame 20 consisting of two V-shaped members 21 each including a rear axle support 22. The fourth member is a hanger tube 23. The automatic machine 24 in accordance with the present invention brazes these members together to form a unitary frame 15. The operations performed by the machine 24 braze the upper and lower front tubes 17 and 18 to the head tube 16. They also braze the top of the upright tube 19 to both the upper front tube and to the upper end of the rear frame 20 as shown in FIG. 4. In addition, they braze the lower front and upright tubes 18 and 19 and the lower end of the rear frame 20 to the hanger 23 as illustrated in FIG. 5.

General Description of the Machine

Figure 1:
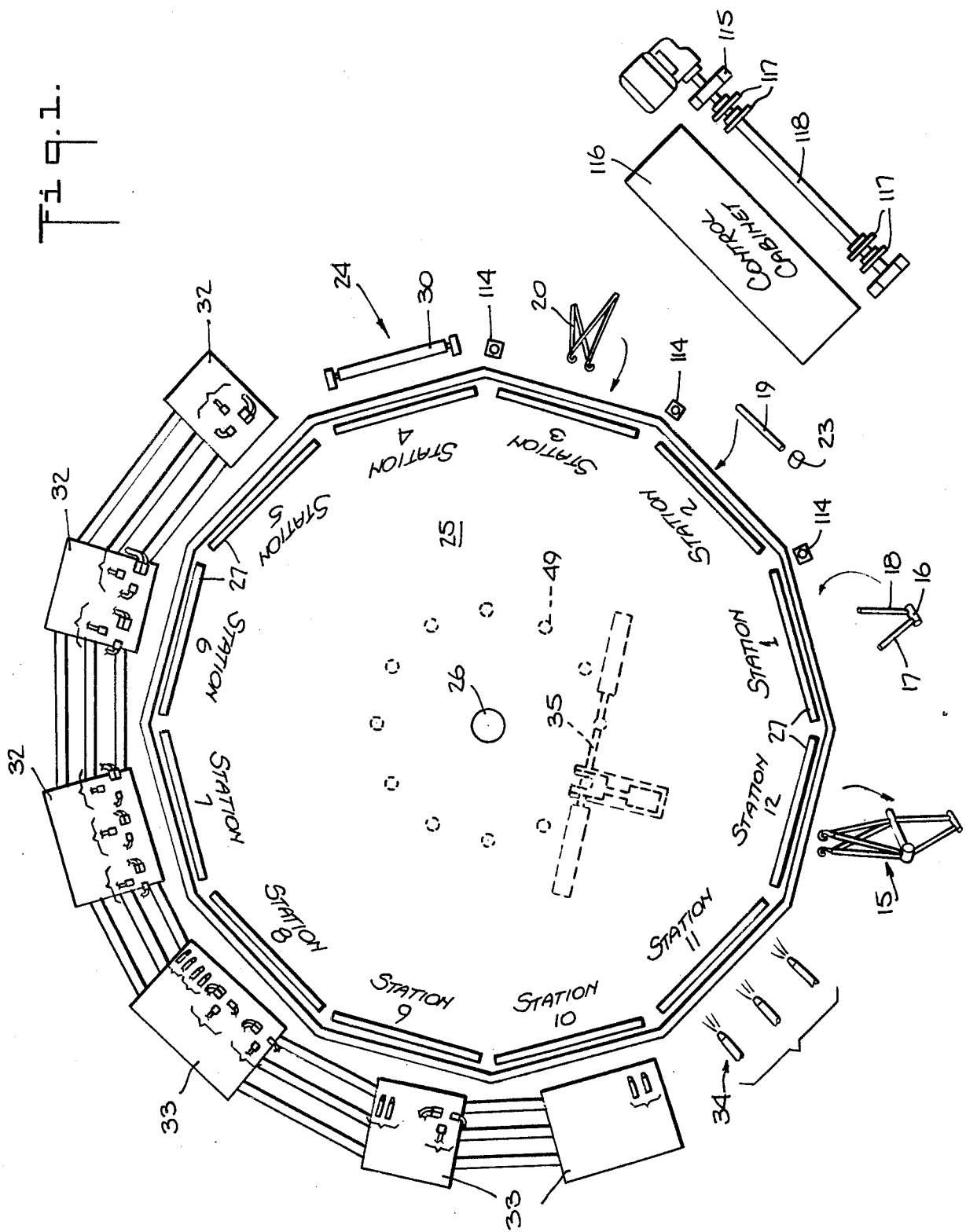
FIG. 1 is a diagrammatic plan view of an automatic fastening machine in accordance with the present invention.
Figure 11:
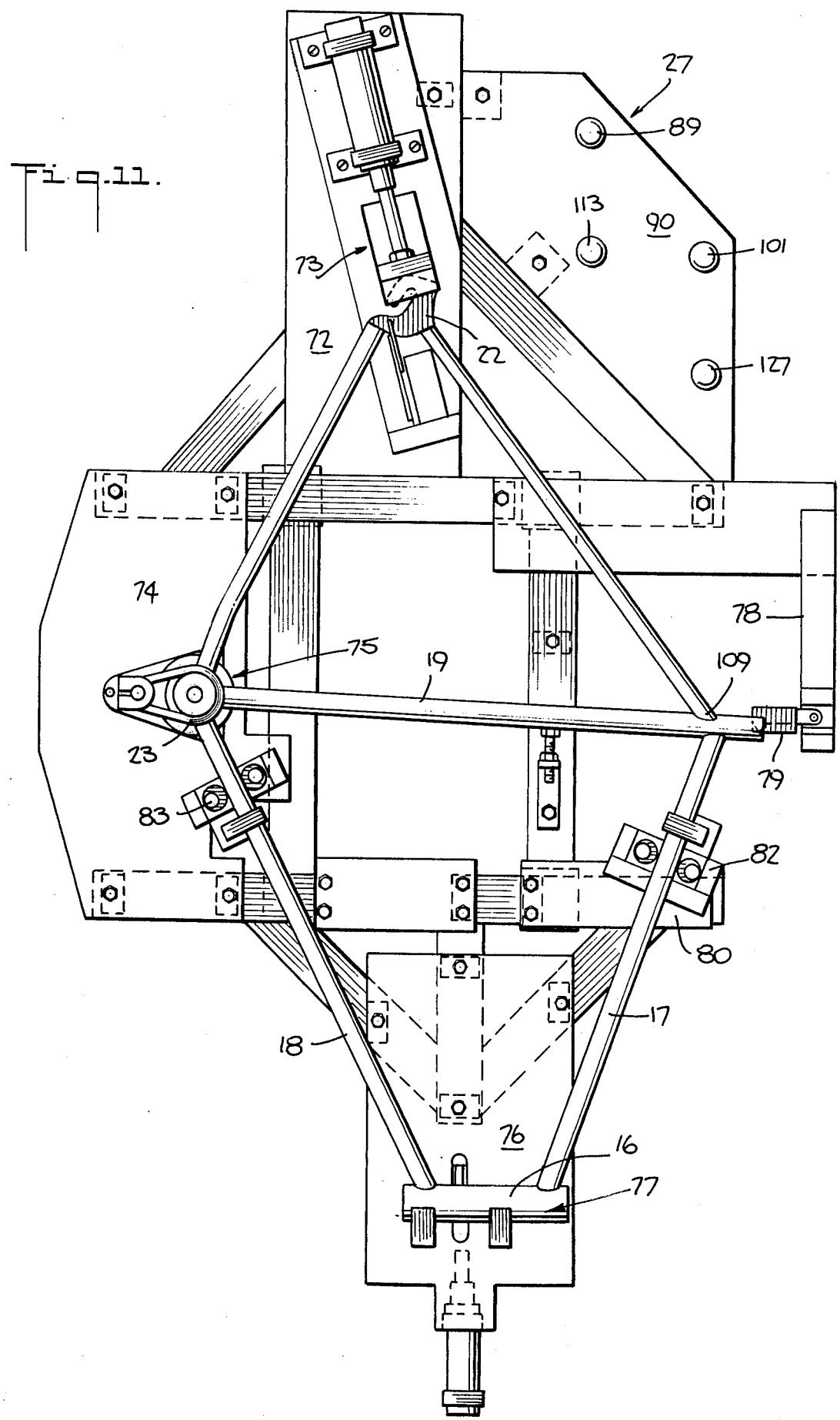
FIG. 11 is a front elevational view of the brazing fixture of FIG. 10.

FIG. 1 is a diagrammatic plan view of the preferred embodiment of the machine 24. The principal portion of the machine comprises a large turret 25 mounted for stepped rotation about a vertical center post 26. The turret 25 mounts a number of brazing fixtures 27 as, for example, twelve fixtures 27 around its outer periphery. Each of the fixtures 27 of the general form illustrated in FIG. 11 is proportioned to mount a bicycle frame 15 in its assembled form. As will be described below, each of the fixtures 27 includes a number of clamps which engage and align the above described members of the bicycle frame 15 in the final frame form for the brazing operation.

A number of work stations 1-12 corresponding to the number of fixtures 27 are positioned around the edge of the main turret 25 at which the loading, aligning, fluxing, heating, brazing, cooling, and unloading operations are performed.

At Station 1, for example, a brazing fixture 27 is presented to an operator who loads the assembled head, upper front and lower front tubes 16, 17, 18 onto the brazing fixture. When this partially loaded brazing fixture 27 is carried to Station 2, a second operator using suitable clamps loads the hanger tube 23 and the upright tube 19 onto the brazing fixture 27.

At Station 3, the final portion of the frame 15 which is the rear frame 20 is loaded on the fixture 27 so that all of the frame members are now in their proper relative positions and are aligned for the subsequent brazing operations. An automatic fluxing assembly 30 is provided at Station 4 which includes a number of flux spray nozzles 31 which direct flux onto the tube members at the brazing points.

At Stations 5 through 10, a series of heating and brazing steps are performed at each of the brazing points described above so that all members of the frame are rigidly fastened together by the time that the brazing fixture 27 leaves Station 10. In general, each of the areas to be brazed is heated at several heating stations 32 in succession, such as three stations, and is then brazed at the next station which is a brazing station 33. Since it is preferred that only one brazing operation be performed at a single station, six stations are used to complete brazing operations at the three fastening areas by the method which will be more fully described below. At Station 11 the finished brazes are cooled by water sprays 34 and at Station 12 the completed frames 15 are removed from the machine 24.

The Turret and the Pneumatic Turret Indexer

A preferred embodiment of the turret 25 which supports the brazing fixtures 27 together with the turret indexer 35 for periodically advancing the brazing fixtures 27 from station to station will now be described with particular reference to FIGS. 6-9. The principal moving member in the machine is the large turret 25 which mounts the brazing fixtures 27 at its edge. A preferred embodiment of this turret includes a number of brazing fixtures 27 as, for example, twelve fixtures 27 which number corresponds to the number of operating stations 1-12 spaced around the edge of the turret 25.

Figure 6:
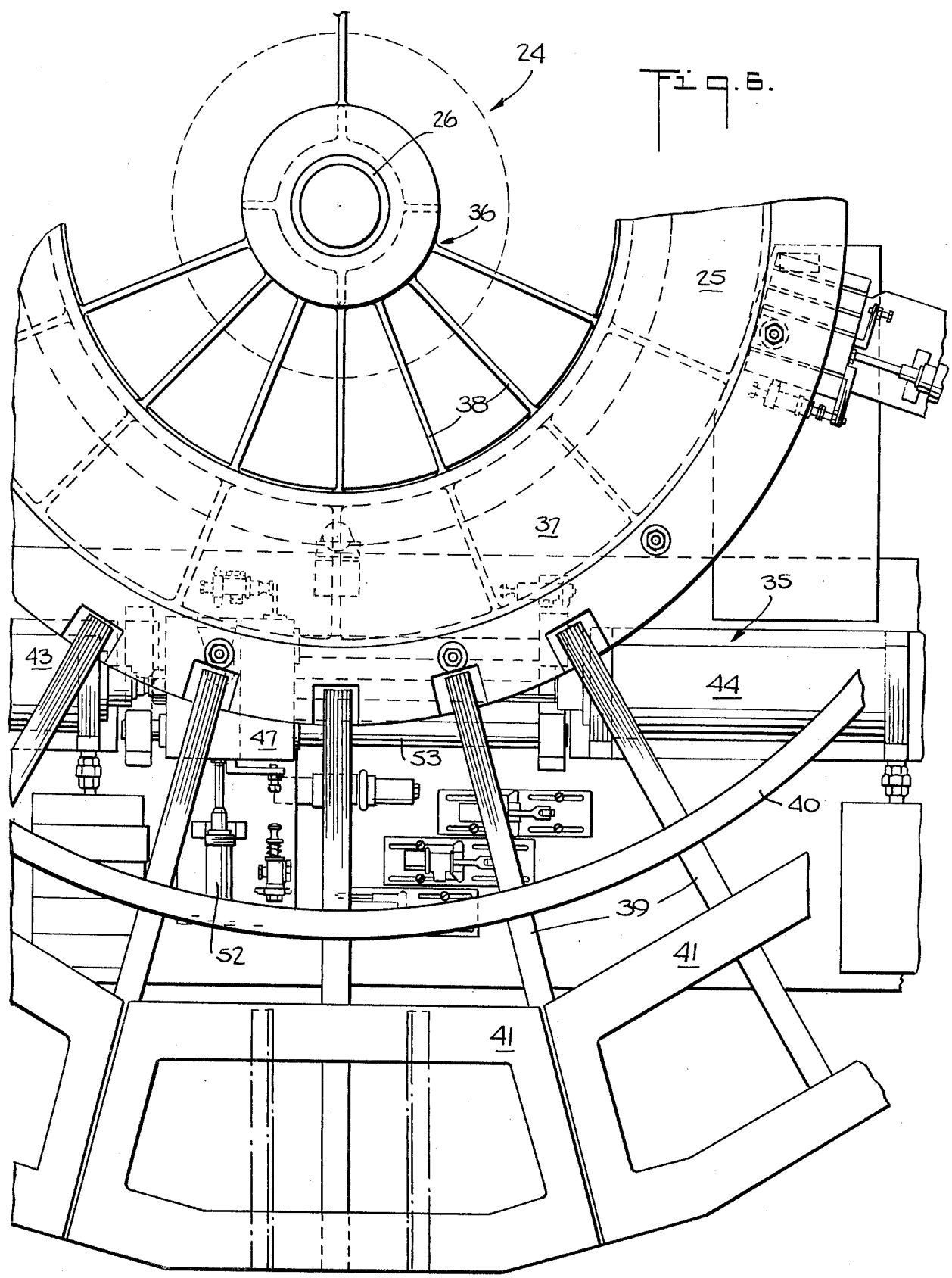
FIG. 6 is a fragmentary plan view of the machine turret including the pneumatic turret indexer.

FIG. 6 illustrates the preferred embodiment of the turret 25 mounted for rotation on suitable bearings about a vertical central post 26. The central portion of the turret 25 comprises a hub 36 with suitable circular flanges 37 and radial support ribs 38. The radial outer portion of the turret 25 comprises a relatively lightweight frame including radial spokes 39 attached to the hub 36 and generally circular frame members including an inner support ring 40 and fixture support plates 41 which mount brazing fixtures 27. The turret 25 including the turret members themselves and the brazing fixtures 27 with the related controls and air lines and clamp members forms a relatively heavy structure. In order to present each of the brazing fixtures 27 successively to the several work stations 1-12, and in order to insure a smooth and a precise positioning of the fixtures with relation to the various fluxing, heating, and brazing devices at these stations, a smooth high powered precision drive system is used to periodically step or turn the turret 25 the necessary fractional turn to advance the brazing fixtures 27 from one station to another.

A preferred form of the indexer comprises the pneumatic indexer illustrated at 35 in FIG. 6 in its position with respect to the turret 25 and illustrated in greater detail in FIGS. 7, 8 and 9.

The drive for the indexer 35 comprises a pair of opposed pneumatic drive cylinders 43 and 44 whose pistons 45 and 46 are coupled to a notched drive plate 47 which is moved back and forth between the positions illustrated in FIG. 7. The drive plate 47 includes a cam notch 48 which engages the spaced indexing rollers 49 on the turret 25 during the turret advance and which is moved clear of the rollers 49 during the return motion of the drive pistons 45 and 46. The pistons 45 and 46 are mounted on a stationary platform under the rotary turret and the drive plate 47 is mounted on the same platform on a mounting which permits the drive plate 47 to move back and forth in the direction of the turret path as well as right angles to the turret path for its disengaging operation.

FIGS. 7-9 illustrate a support platform 50 for the drive plate 47 which is moved by the combined action of the drive cylinders 43 and 44 to advance the index rollers 49 of the main turret 25. The plate 47 is slidably mounted upon a track 51 (FIG. 7) aligned radially of the turret 25 on the platform 50. The radial motion of the drive plate 47 is provided by an air actuated motor 52 mounted on the platform 50. The platform 50 is mounted for movement generally parallel to the movement of the turret 25 during the advancement of the turret 25 from one station to another on a pair of guide rods 53. The rate of movement of the turret 25 is successively reduced by the three control switches shown at 54, 55 and 56 in FIG. 7. Three cams 58, 59 and 60 mounted on the platform 50 are employed which successively engage the switches 54–56 to reduce the air pressure applied to the drive cylinders 43 and 44 to reduce the velocity by switches 54 and 55 and to then stop movement of the turret by switch 56.

Additional air control switches provide for the movement of the plate 47. A switch 61 (FIG. 7) is engaged to move the plate radially outwardly and out of engagement with a roller 49. Switch 62 then returns the platform 50 to its initial start position whereupon the switch 63 then activates the piston 52 to reengage the drive plate 47 with another roller 49. Each of the brazing fixtures 27 include a number of clamps for engaging the several tubular parts of a frame, such as the bicycle frame 15, and for holding and aligning these parts during a brazing operation. The parts of the frame 15 are loaded onto the brazing fixtures by operators at Stations 1, 2 and 3.

After the three loading Stations 1, 2 and 3 where the parts of the bicycle frame are positioned on the turret on the brazing fixtures 27, a number of heating and brazing stations perform the fastening steps for completing a unitary bicycle frame. When the several portions of the frame 15 have been clamped and aligned in their final position in a brazing fixture 27, the brazing fixture 27 is presented to a fluxing Station 4 where flux is sprayed onto the areas to be brazed.

At a first heating Station 5, the hanger tube 23 and the related tubing members to be brazed to it are heated to start bringing their temperatures up to the brazing temperature. After a suitable interval, the turret 25 carries these members on the fixture 27 to a second heating Station 6 where the heating of these tubular members is continued together with the start of the heating of the head tube 16 and its connected tubes. Next, the brazing fixture 27 is advanced to Station 7 for a final heating preparatory to its being brazed at Station 8.

The head tube 16 receives its second heating at Station 7 a third heating at Station 8 and it is brazed to the front tubes 17 and 18 at Station 9.

The top of the upright tube 19 and the adjacent portions of the upper front tube 17 and the rear frame 20 are similarly heated at Stations 7, 8 and 9 and are brazed at Station 10. Thus, each of the brazing areas is heated at three stations and is brazed at a fourth station.

At Station 11, the brazed frames 15 are sprayed with cooling water and at Station 12 the clamps on the brazing fixture all open to permit the unloading of the completed frames 15.

Detailed Description of the Brazing Fixtures

Figure 10:
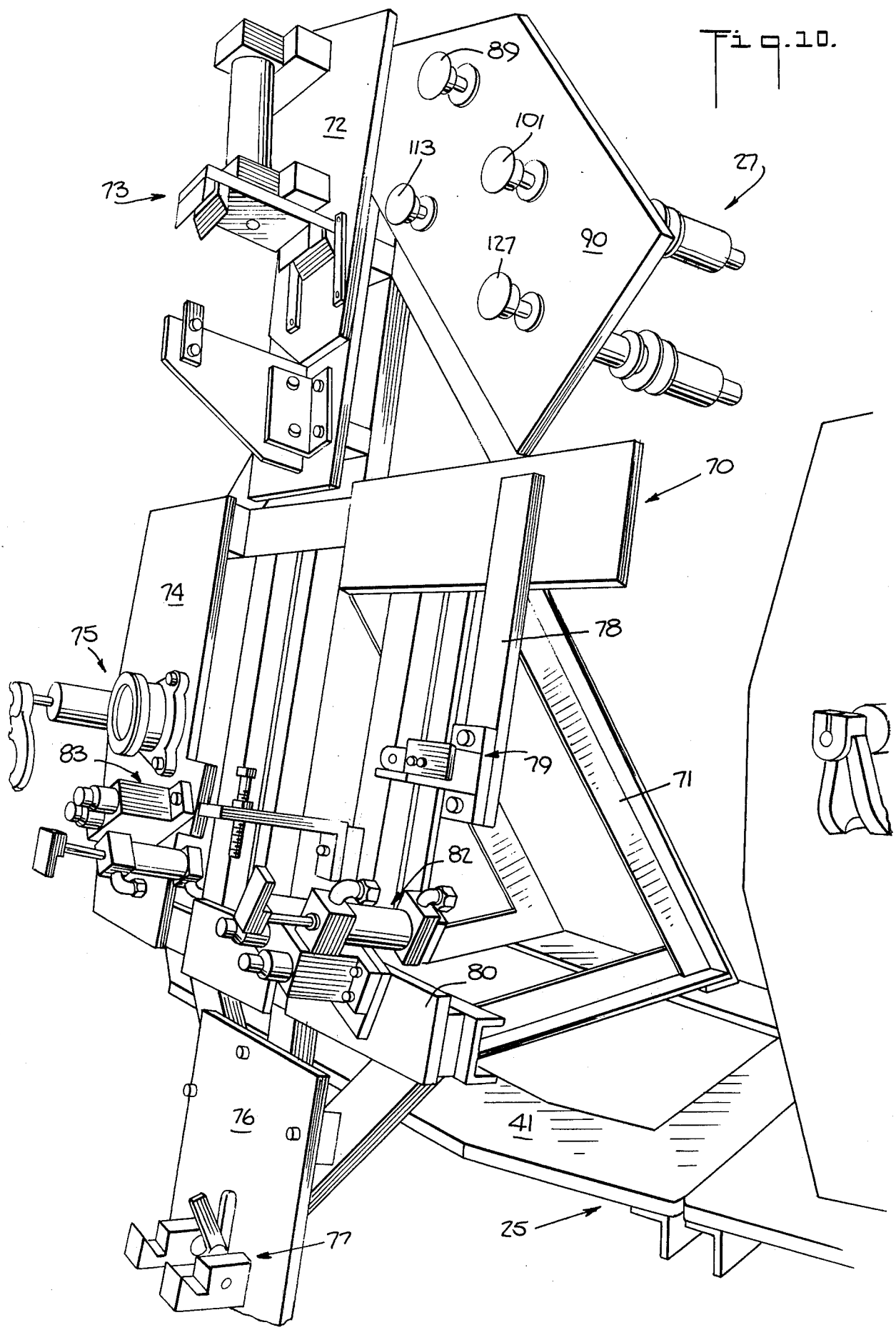
FIG. 10 is a perspective view of a brazing fixture mounted on the edge of the machine turret.
Figure 12:
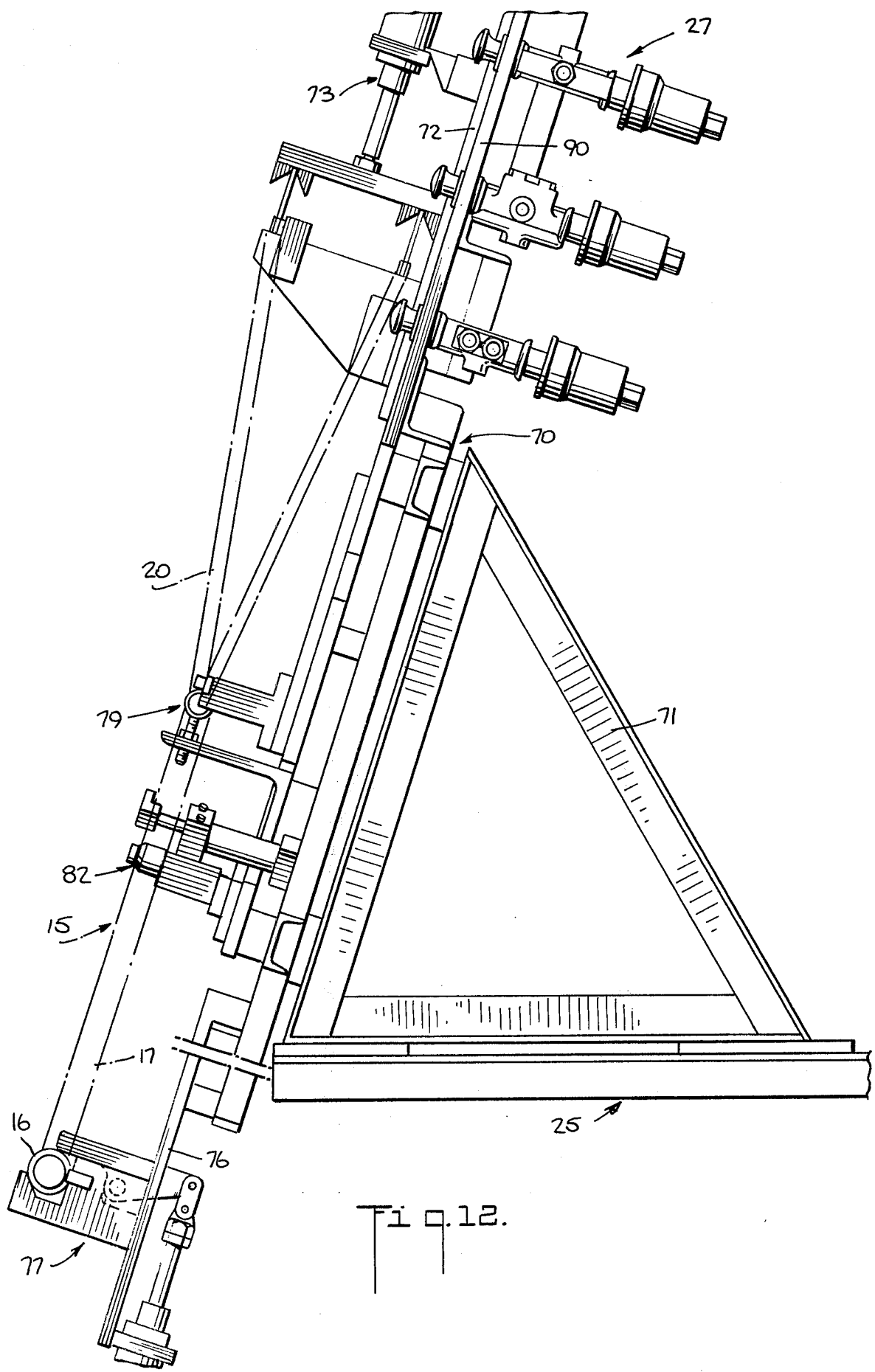
FIG. 12 is a side elevational view of the brazing fixture of FIG. 10.

As best illustrated in FIGS. 10–12, each brazing fixture 27 comprises a frame 70 mounted at a slight angle to the vertical by means of spaced braces 71 attached to the turret mounting plates 41. The frame 70 includes a number of appropriately positioned mounting plates for several frame engaging clamps. One of the principal mounting plates is a rear frame clamp mounting plate 72 which supports the rear frame clamp assembly 73. A second mounting plate is the hanger tube clamp mounting plate 74 which supports the hanger tube clamp assembly 75. A third mounting plate is the lowermost mounting plate which is a head tube clamp mounting plate 76 for the head tube clamp assembly 77. Lesser support plates or members comprise a support bracket 78 for the upright tube slot gauge assembly 79 and a mounting plate 80 for the upper front tube clamp 82. The clamp 83 for the lower front tube 18 is mounted on the hanger tube clamp mounting plate 74.

The several above mentioned clamp assemblies will now be described. The first members of the frame which are loaded onto a brazing fixture 27 at Station 1 are the preassembled head tube 16 and the upper and lower front tubes 17 and 18. The head tube 16 is fitted into the head tube clamp assembly 77 by the operator who also positions the upper and lower front tubes 17 and 18 within the spaced front tube clamps 82 and 83. The head tube clamp assembly 77 is illustrated in detail in FIGS. 13 and 14. It includes spaced brackets 84 to receive the head tube 16 together with an end stop 85 for determining the axial location of the tube 16 in the brackets 84. A locking clamp arm 86 is pivotally mounted at 87 on the assembly for movement between its locking position, as shown in full lines in FIG. 14, and its release position, as shown in dot-dash lines by an air motor 88. The air motor 88 is under the control of an air switch 89 mounted on a switch panel 90 at the top of the brazing fixture 27. When the operator has positioned the head tube 16 and the upper and lower front tubes 17 and 18, he presses the switch 89 to lock the tubes in place.

The two front tube clamps 82 and 83 are generally similar and a preferred embodiment of a clamp 82 is illustrated in FIG. 21. The clamp 82 includes spaced tube positioning guides 91 and a movable clamp arm 92 which is moved between its open and its locked positions by an air operated rotating clamp 93. The clamps 82 and 93 are controlled by the same switch 89 which operates the head tube clamping arm 86.

At Station 2, a second operator loads the hanger tube 23 and the upright tube 19 onto the brazing fixture 27. This is done by the operator placing the hanger tube 23 into the hanger tube clamp assembly 75 while simultaneously positioning the upright tube 19 in its mounting hole within the hanger tube 23 and with its upper end positioned by an adjustable stop 94 and the upright tube slot gauge assembly 79.

A preferred embodiment of the hanger tube clamp assembly 75 is illustrated in FIGS. 18–20. The clamp 75 includes a clamp arm 95 mounted on a piston 96 within a suitable bearing 97 which includes a spiral cam slot 98 and cam follower 99 for rotating the clamp arm 95 as it is moved from its open position, as seen in dot-dash lines, to its closed position as seen in solid lines in FIG. 19. An air operated drive motor 100 moves the clamp arm 95 between these positions under the control of a switch 101 on the switch plate 90. The correct alignment and relative positions of the hanger tube 23 and the upright tube 19 are obtained by using the adjustable stop member 94 and the upright slot gauge assembly 79 (FIGS. 13 and 15). The upright tube 19 has an indexing slot 102 provided at its upper end which is engaged by the pivotally mounted stop member 103 which is swung into the slot 102 to assure the correct positioning of the upright tube 19.

Figure 23:
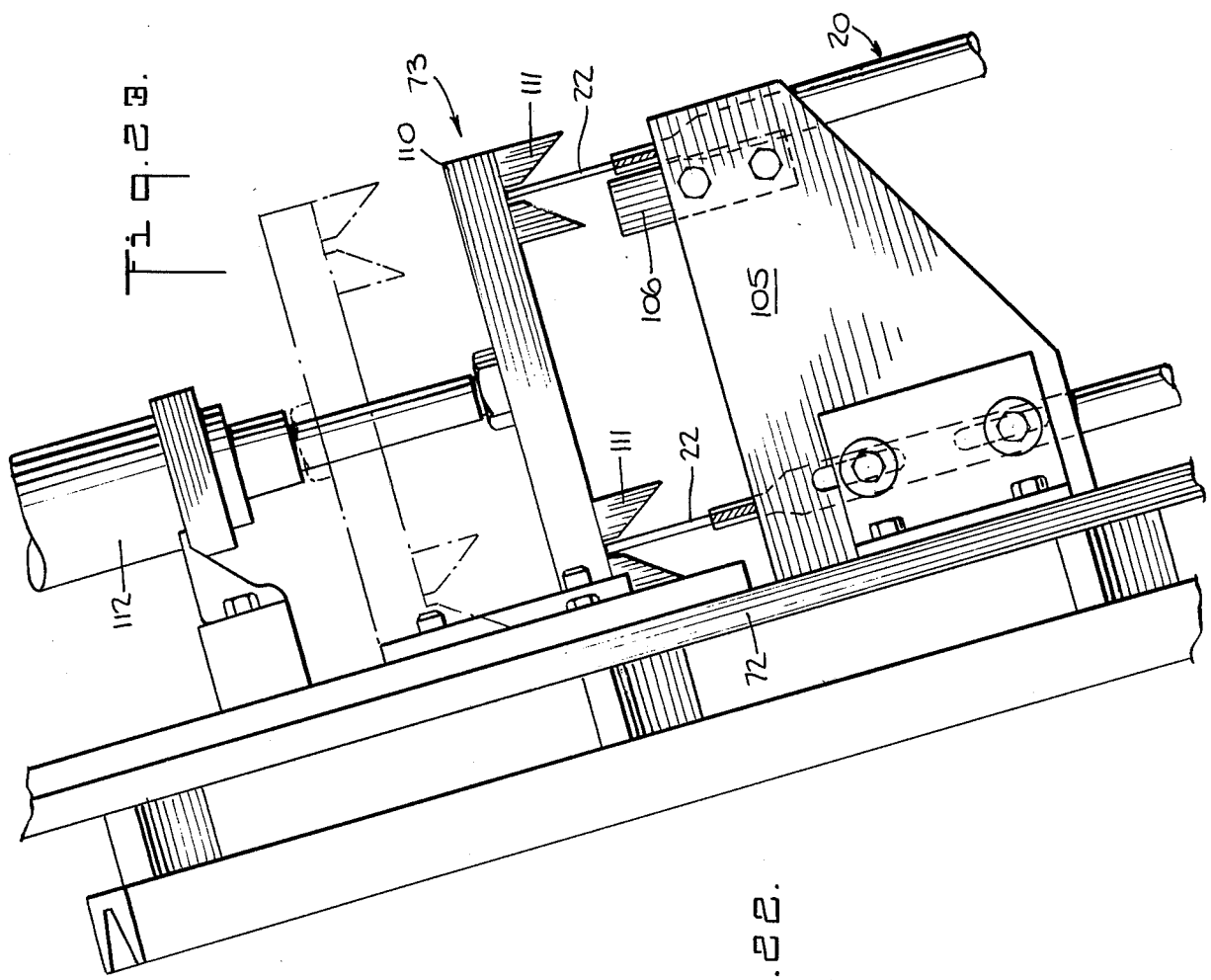
FIG. 23 is a side elevational view of the rear frame clamp assembly of FIG. 22.
Figure 22:
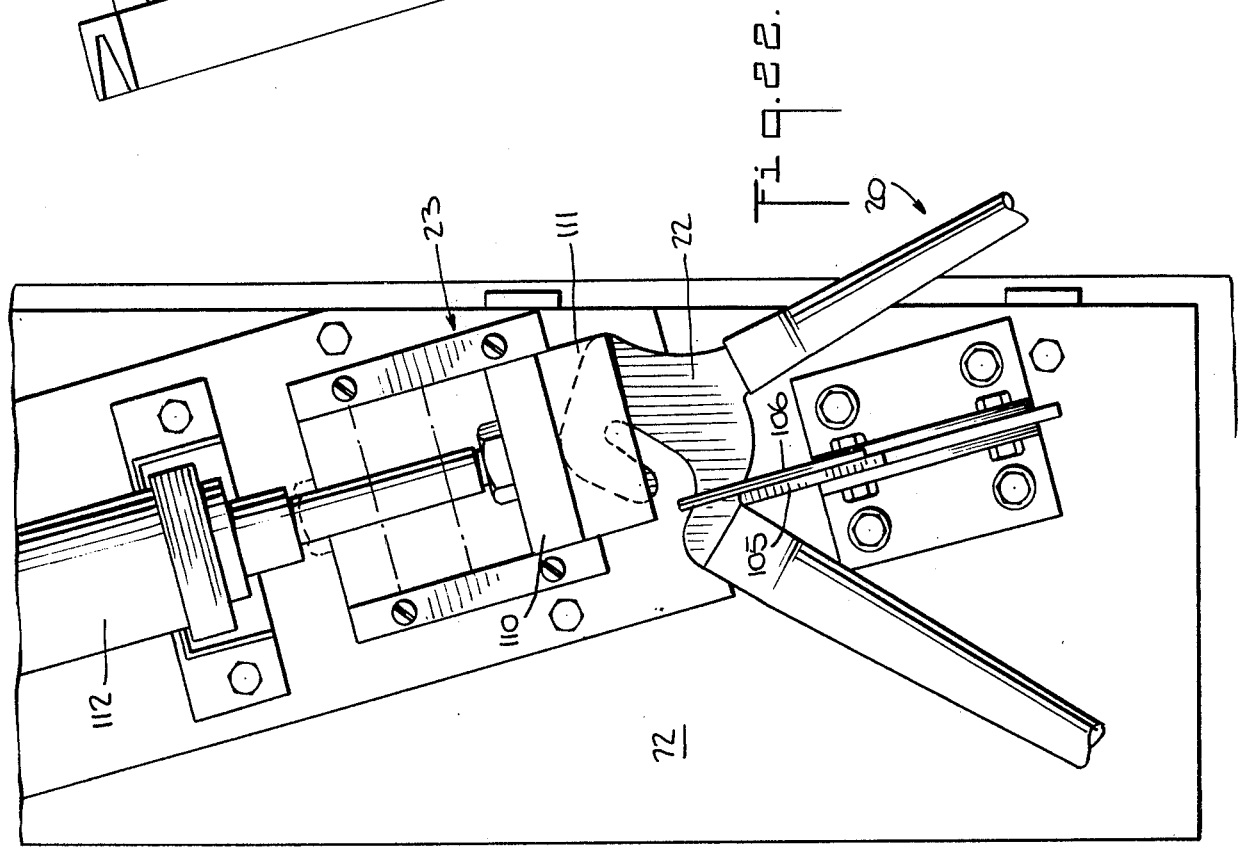
FIG. 22 is an enlarged detailed front elevational view of the rear frame clamp assembly.

The final portion of the frame 15, which is the rear frame assembly 20, is mounted on the brazing fixture 27 at Station 3 by a third operator. In order to do this, the operator positions the rear end of the assembly 20 comprising the spaced and slotted axle supports 22 on a support bracket 105, as illustrated in FIGS. 22 and 23, using a positioning stop 106 for location. Meanwhile, the spaced ends 107 (FIGS. 2 and 5) of the lower tubes are inserted into appropriate spaced holes 108 in the hanger tube 23 while the shaped ends of the upper tube 109 are positioned against the upright tube 19 in the manner illustrated in FIGS. 4 and 11. A clamp arm 110 including two V-shaped clamping notches 111 is now moved downwardly into position against the axle supports 22 by a pneumatic drive motor 112 which is actuated by the operator actuating a switch 113 on the switch plate 90.

The bicycle frame 15 has now been properly aligned and clamped into position in a brazing fixture 27 preparatory to the subsequent fastening steps. An interlock switch 114 is positioned at each of Stations 1, 2 and 3 which is closed by each operator only after he has completed his loading step. These serially connected switches must all be pressed to initiate the stepped advance of the turret 25 by the above described pneumatic indexer. Closing the three switches 114 closes a clutch 115 at the control cabinet 116 (FIG. 1) causing the timing cams 117 mounted on the motor driven shaft 118 to rotate. These cams control the start of the turret 25 indexer as well as the operation of the various fluxing, heating, brazing and cooling devices which operate during the turret dwell periods.

Head Tube Gauge Assembly

The precise alignment of the head tube 16 with respect to the upper and lower front tubes 17 and 18 is important in producing the bicycle frames 15. In order to insure this result, a head tube gauge assembly 120 is provided at Station 1 which is activated after the operator has placed the head and front tubes 16–18 in position on the brazing fixture 27.

A preferred embodiment of such a head tube gauge assembly 120 is illustrated in FIGS. 16 and 17. As already described, the head tube 16 is gripped in the head tube clamp assembly 77, however, minor adjustments of the head tube 16 position may be made to insure a precise alignment. These adjustments are made by the head tube gauge assembly 120. These adjustments are made by a pair of spaced alignment rods 121 which are slidably mounted in bearings 122 on the upper portion of a gauge assembly plate 123. The plate 123 is pivotally mounted at 124 on a suitable bracket 125 at Station 1. The plate 123 has a first position as illustrated in dash-dot lines outwardly of the brazing fixture 27 to permit turret indexing. It has a second operative position shown in solid lines for its gauging operation. It is moved to this position by a pneumatic drive cylinder 126 which is activated by the operator depressing a switch 127 on the brazing fixture switch plate 90 after he has pressed the head tube clamp switch 89. As soon as the gauge plate is moved inwardly to its operative position, a control valve 128 activates a pair of pneumatic pistons 129 to move the spaced alignment rods 121 into the head tube 16 in an aligning operation through the intermediation of a pair of pivotally mounted cranks 130. A pair of spaced air valves 131 are activated by the gauging movement to initiate the return operation of the cranks 130 to withdraw the aligning rods 121 from the head tube 16 and to cause the gauge plate 120 to be swung outwardly to its rest position.

The Fluxing Station

After the several parts of the bicycle frame 15 have been properly locked into position by the above described clamps on a brazing fixture 27, the machine turret 25 advances the fixture 27 to fluxing Station 4. At the fluxing station, as illustrated in FIGS. 24 and 25, an automatic fluxing assembly 30 carries a number of flux spray nozzles 31 for applying flux to the brazing areas of the bicycle frames 15. A frame 134 is pivotally mounted on a base 135 so that it may be swung toward the brazing fixture 27 by a pneumatic drive cylinder 136. The drive cylinder 136 is activated by a suitable control cam 117 at the control 116 (FIG. 1). The several nozzles 31 on the frame 134 are adjustably positioned to apply a flux to the areas of the frame tubes which are to be brazed at the brazing stations. A suitable flux supply system for the nozzles provides for a continuous supply of the fluxing liquid to the nozzles with the nozzle spray valves being also controlled by an appropriate cam 117 on the cam control 116. One suitable flux supply system is described, for example, in issued U.S. Pat. No. 3,741,150 owned by the assignee of the present invention. The control cam system 116 provides for the outward movement of the flux spray frame 134 to its rest position prior to the next stepped advance of the turret 25.

The Heating and Brazing Stations

Stations 5 through 10 are provided for the heating and brazing operations. As already indicated, there are three principal areas of the frame 15 where tubes are brazed together to form the completed bicycle frame. At each of these general locations, three heating operations are performed to raise the temperature of the tubes to the proper brazing temperature and then a brazing operation is performed at a fourth station. For example, heating flames are first directed to the hanger tube 23 at Stations 5, 6 and 7 and then a brazing operation is performed at Station 8.

The heating step is performed by directing a number of air, gas, oxygen flames against the tube members at the area of the assembled frame which is to be brazed.

FIG. 26 illustrates a burner arrangement suitable for pre-heating the hanger tube 23 and the adjacent tube members of the bicycle frame. This arrangement is mounted on a support plate 32 of the burner mounting plate assembly. It includes a movable frame 140 supported on the plate 32 by suitable rollers 141 and includes a pneumatic drive cylinder 142 for moving the nozzles 143 into the heating position for a heating period during a turret dwell period. The timing or control of the pneumatic cylinder 142 is done by a suitable cam 117 on the above described control 116 (FIG. 1). In addition to the movable nozzles 143 which are positioned to apply heating flames directly to the brazing areas, additional stationary nozzles 144 may be mounted on fixed support members at Station 5 and at the other heating and brazing stations 6 through 10 on a frame work of the type illustrated at 145 in FIG. 27. The exact heating nozzle arrangement is set in accordance with the particular shapes and sizes of the frame members being brazed.

At Stations 6 and 7 the heating of the hanger tube 23 is continued by similar heating nozzle arrangements. These heatings bring the temperature of the hanger tube 23 and the adjacent tubes up to a temperature approximately equal to the brazing temperature.

At Station 8, the brazing operation is performed by a brazing wire feeder device a preferred form of which is illustrated in FIGS. 28 and 29.

These brazing wire feeders 150 may be of the general form described in pending U.S. Ser. No. 367,371 filed on June 6, 1973 and owned by the assignee of the present invention.

Each of the wire feeders 150 includes a brazing wire 151 support 152 slidably mounted on guide rods 153 for movement towards and away from the brazing point by a pneumatic drive cylinder 154 controlled by a cam 117 on the control 116 (FIG. 1). The brazing wires 151 are fed through guiding nozzles 155 past a heating flame 156 when the nozzles have been advanced to the frame 15 by wire drive rollers 157 controlled by another timing cam 117 on the programmer 116.

While the heating and brazing operation is being performed on the hanger tube 23 at Stations 5–8, as described above, a corresponding brazing operation is carried out at Stations 6–9 for the head tube 16. At Station 6, additional heating nozzles generally similar to those of FIG. 26 are directed to pre-heat the head tube 16. The heating of the head tube is continued at Stations 7 and 8 by similar nozzles. The brazing wire feeder is mounted at Station 9 to perform the brazing operation on the head tube 16 and tubes 17 and 18. A wire feeder similar to that illustrated in FIGS. 28 and 29 forms the brazes between the upper and lower front tubes 17 and 18 and head tube 16.

A corresponding series of heating and brazing operations are performed at Stations 7–10 for fastening the upper portion of the upright tube 19 to the front tube 17 and the rear frame 20 as illustrated in FIG. 4.

As each brazing fixture 27 is moved into Station 11, the brazing operations on the frame are complete. At Station 11, water sprays are directed by nozzles 34 over each of the completed brazes to cool the completed frames 15.

At Station 11, a trip switch on the brazing fixture 27 is activated by turret motion or a switch at control 116 is activated by a cam 117 to release all of the frame engaging clamps permitting the tooling operation on the frame to be done without damaging stresses which might be caused if the frames remained tightly clamped. At Station 12 the operator removes the completed frames 15 from the machine.

It will be seen that an automatic or semi-automatic frame fastening machine has been described of the type particularly suitable for brazing or welding together the several tube members of a bicycle frame or another frame-like assembly. The machine includes a plurality of spaced work stations for carrying out simultaneous operations such as fluxing, heating or brazing so that a high speed frame assembly operation results producing uniformly perfect frames at relatively high speeds. The result is a new machine which substantially reduces the labor costs for producing articles such as brazed or welded bicycle or other frames.

The improved and automatic machine of the invention has a novel design which permits it to fasten a number of support tubes together using relatively inexperienced operators and the construction is easily adapted for modifications whereby it may be used on a number of differing specific frame designs using differing brazing or welding operations.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An automatic frame fastening machine comprising the combination of:

a turret;

means for mounting said turret for rotation about an axis;

a plurality of frame fastening fixtures mounted around the edge of said turret;

a plurality of work stations positioned around said turret;

means for providing a stepped rotation of said turret to move the said fastening fixtures to said stations;

clamps for engaging a plurality of frame members on said fastening fixtures;

switch means on said fastening fixtures for operating said clamps;

fastening means including heating means positioned at a plurality of said work stations for fastening frame members together;

control and timing means for operating said turret, clamps, and fastening means;

said work stations including a plurality of adjacent frame member loading stations with an interlock switch at each loading station;

means coupling said interlock switches requiring the interlock switches at all stations to be activated prior to turret rotation; and gauging means movably mounted adjacent to one of said loading stations including a motor driven gauging rod for positioning frame members clamped onto a fastening fixture.

2. The machine as claimed in claim 1 which further comprises a clamp operating switch for each clamp on a fastening fixture positioned for activation by an operator.

3. The machine as claimed in claim 1 in which the frame fastening means at said stations includes brazing wire feeding means including means for moving the entire wire feeding means toward and away from the fastening fixtures, and including means for advancing individual brazing wires.

4. The machine as claimed in claim 3 in which said brazing wire feeders include means for advancing a predetermined length of brazing wire against a heated portion of a frame member, and means for heating each wire during said advance.

5. The machine as claimed in claim 1 in which said fastening fixture clamps include a first clamp proportioned for removably engaging a hanger tube on a bicycle frame, a second clamp for removably engaging a bicycle frame head tube, and a plurality of additional clamps for engaging additional bicycle frame tube members.

6. The machine as claimed in claim 1 wherein said fastening fixtures are arranged for clamping bicycle frame members, and wherein said plurality of adjacent work stations are provided for frame member loading.

7. The machine as claimed in claim 1 in which said work stations comprise a frame cooling station positioned beyond the final fastening station.

8. The machine as claimed in claim 7 in which said cooling station includes means for releasing said fastening fixture clamps prior to the cooling operation.

9. The machine as claimed in claim 1 which further comprises a timing means for controlling said work stations including a plurality of timing cams driven in synchronism with each other.

10. The machine as claimed in claim 1 in which the frame fastening means comprises frame heating and frame brazing stations including brazing wire feeding means.

11. An automatic frame fastening machine comprising the combination of:
a turret;
means for mounting said turret for rotation about an axis;
a plurality of frame fastening fixtures mounted around the edge of said turret;
a plurality of work stations positioned around said turret;
means for providing a stepped rotation of said turret to move the said fastening fixtures to said stations;
clamps for engaging a plurality of frame members on said fastening fixtures;
switch means on said fastening fixtures for operating said clamps;
fastening means including heating means positioned at a plurality of said work stations for fastening frame members together;
control and timing means for operating said turret, clamps, and fastening means;
said work stations comprising a frame member loading station, a plurality of fastening stations, and a frame cooling station positioned beyond the final fastening station;
gauging means movably mounted adjacent to said loading station; and
said gauging means including a motor driven gauging rod for positioning frame members clamped onto a fastening fixture.

12. The machine as claimed in claim 11 which further comprises a clamp operating switch for each clamp on a fastening fixture positioned for activation by an operator.

13. The machine as claimed in claim 11 wherein a plurality of adjacent work stations comprise frame member loading stations and where an interlock switch is provided at each loading station, and means coupling said interlock switches requiring the interlock switches at all stations to be activated prior to turret rotation.

14. The machine as claimed in claim 11 including brazing wire feeders having means for moving the entire feeder toward and away from the fastening fixtures, and means for advancing individual brazing wires.

15. The machine as claimed in claim 14 in which said brazing wire feeders include means for advancing a predetermined length of the brazing wire against a heated portion of a frame member, and means for heating each wire during the advance.

16. The machine as claimed in claim 11 in which said fastening fixture clamps include a first clamp proportioned for removably engaging a hanger tube on a bicycle frame, a second clamp for removably engaging a bicycle frame head tube, and a plurality of additional clamps for engaging additional bicycle frame tube members.

17. The machine as claimed in claim 11 wherein said fastening fixtures are arranged for clamping bicycle frame members, and wherein a plurality of adjacent work stations are provided for a frame member loading with an interlock switch at each frame member loading station, said interlock switches being interconnected requiring all interlock switches to be activated prior to turret rotation.

18. The machine as claimed in claim 11 in which said work stations comprise a frame member loading station, a plurality of brazing stations, and a frame cooling station positioned beyond the final brazing station.

19. The machine as claimed in claim 18 in which said cooling station includes means for releasing said fastening fixture clamps prior to the cooling operation.

20. The machine as claimed in claim 1 which further comprises a timing means for controlling said work stations including a plurality of timing cams driven in synchronism with each other.

21. The machine as claimed in claim 11 in which the frame fastening means comprises frame heating and frame brazing stations including brazing wire feeding means.

* * * * *